United States Patent [19]
Ball

[11] 4,357,534
[45] Nov. 2, 1982

[54] FIRE AND EXPLOSION DETECTION

[75] Inventor: David N. Ball, Slough, England

[73] Assignee: Graviner Limited, Buckinghamshire, England

[21] Appl. No.: 166,560

[22] Filed: Jul. 7, 1980

[30] Foreign Application Priority Data

Jan. 17, 1980 [GB] United Kingdom ................ 8001653

[51] Int. Cl.³ ................ G01J 1/00

[52] U.S. Cl. ................ 250/339; 250/342; 250/349

[58] Field of Search ................ 340/578, 587, 589; 250/339, 340, 349, 338, 554, 342

[56] References Cited

U.S. PATENT DOCUMENTS

| | | | |
|---|---|---|---|
| 3,825,754 | 7/1974 | Cinzori et al. | 250/338 |
| 4,101,767 | 7/1978 | Lennington et al. | 250/340 |
| 4,206,454 | 6/1980 | Schapira et al. | 250/554 |
| 4,220,857 | 9/1980 | Bright | 250/339 |

FOREIGN PATENT DOCUMENTS

| | | |
|---|---|---|
| 1064727 | 4/1967 | United Kingdom . |
| 1176891 | 1/1968 | United Kingdom . |
| 1329430 | 9/1973 | United Kingdom . |
| 1432106 | 4/1976 | United Kingdom . |
| 1462913 | 1/1977 | United Kingdom . |
| 1550334 | 8/1979 | United Kingdom . |
| 2020420 | 11/1979 | United Kingdom . |
| 2020870 | 11/1979 | United Kingdom . |
| 1578611 | 11/1980 | United Kingdom . |

*Primary Examiner*—Alfred E. Smith
*Assistant Examiner*—Carolyn E. Fields
*Attorney, Agent, or Firm*—Leydig, Voit, Osann, Mayer & Holt, Ltd.

[57] ABSTRACT

A system for discriminating between radiation produced by a source of fire or explosion to be detected and radiation produced by a source not to be detected comprises two radiation detectors respectively responsive to the intensity of radiation in different wavelength bands to product respective electrical outputs, one band being relatively broad and including the other which is relatively narrow. A rate of rise unit and a threshold unit responsive to the broad band detector produce signals of one binary type when the rate of rise of, and the value of, the intensity of the radiation received by that detector exceed predetermined values. A ratio unit measures the ratio of the intensities of the radiation respectively received by both detectors and produces a signal of the opposite binary type when the ratio indicates that the source of the radiation is a fire or explosion to which the system is not to respond. An AND gate produces a fire and explosion indicating output only when the signals of the first binary type exist in the absence of the signal of the opposite binary type.

9 Claims, 5 Drawing Figures

FIRE AND EXPLOSION DETECTION

BACKGROUND OF THE INVENTION

The invention relates to fire and explosion detection systems and more specifically to systems which are able to discriminate between fires and explosions which need to be detected and those which do not.

One example of a situation where the invention can be used is a situation in which it is required to discriminate between the explosion of an ammunition round and a fire or explosion of combustible or explosive material which is set off by that round-so as to detect the fire or explosion set off by the round but not to detect the exploding round itself. In this way, the system can initiate action so as to suppress the fire or explosion set off by the round, but does not initiate such suppression action merely in response to the exploding round.

BRIEF SUMMARY OF THE INVENTION

According to the invention, there is provided a fire and explosion detection system for discriminating between radiation produced by a source of fire or explosion to be detected and radiation produced by a source of fire or explosion not to be detected, comprising two radiation detecting means respectively responsive to the intensity of radiation in different wavelength bands to produce respective electrical outputs, one said band being relatively broad and the other being relatively narrow, means responsive to at least one of the detecting means for producing a first signal when at least one of the parameters comprising the intensity of the radiation received by one of the detecting means and the rate of rise of the intensity of the radiation received by one of the detecting means exceeds a predetermined value, means responsive to the two detecting means to measure the ratio of the intensities of the radiation respectively received by them and to produce a second signal when the ratio indicates that the source of the radiation is a fire or explosion source to which the system is not to respond, and output means connected to receive the first and second signals and capable of producing a fire or explosion indicating output only when the first signal exists in the absence of the second signal.

According to the invention, there is also provided a fire and explosion detection system for discriminating between radiation produced by a source of fire or explosion to be detected and radiation produced by a source of fire or explosion not to be detected, comprising a first radiation detector responsive to the intensity of radiation in a narrow wavelength band centred substantially at 4.4 microns, a second radiation detector responsive to the intensity of radiation in a broad wavelength band centred substantially at 4.4 microns, a threshold unit connected to receive the output of one of the detectors and operative to produce a threshold signal in response to the intensity of radiation received by that detector exceeding a predetermined threshold, a rate of rise unit connected to receive the output of one of the detectors and operative to produce a rate of rise signal in response to the rate of rise of the intensity of radiation received by that detector exceeding a predetermined value, a ratio unit connected to receive the output of both detectors and operative to product an inhibit signal in response to the intensity of radiation received by the first radiation detector being less than that received by the second radiation detector, and a coincidence gate connected to receive the threshold signal and the rate rise signal and responsive to the inhibit signal to produce a fire or explosion indicating output only when the threshold signal and the rate of rise signal exist together in the absence of the inhibit signal.

According to the invention there is also further provided a method of discriminating between radiation produced by a source of fire or explosion to be detected and radiation produced by a source of fire or explosion not to be detected, comprising the steps of detecting the intensity of radiation in two different wavelength bands to produce respective electrical outputs, one said band being relatively broad and the other being relatively narrow, producing a first signal when at least one of the two parameters comprising the intensity of the radiation received in at least one of the wavelength bands and the rate of rise of intensity of the radiation received in at least one of the wavelength bands exceeds a predetermined value, measuring the ratio of the intensities of the radiation respectively received in the two wavelength bands to produce a second signal when the ratio indicates that the source of the radiation is a fire or explosion source to which the system is not to respond, and receiving the first and second signals and enabling the production of a fire or explosion indicating output only when the first signal exists in the absence of the second signal.

DESCRIPTION OF THE DRAWINGS

Fire and explosion detection systems embodying the invention will now be described, by way of example only, with reference to the accompanying diagrammatic drawings, in which:

FIGS. 5A and 5B are graphs corresponding respectively to FIGS. 2A and 2B but for a modified form of the system.

DESCRIPTION OF PREFERRED EMBODIMENTS

One particular application of the system now to be described is for use in armoured personnel carriers or battle tanks which may be attacked by high energy antitank (H.E.A.T.) ammunition rounds. In such an application, the system is arranged to respond to hydrocarbon fires (that is, fires involving the fuel carried by the vehicle) such as set off by the exploding H.E.A.T. round or set off by hot metal fragments produced from or by the round (or set off by other causes), but not to detect either the exploding H.E.A.T. round itself (even when it has passed through the vehicle's armour into the vehicle itself), or the secondary non-hydrocarbon fire which may be produced by a pyrophoric reaction of the H.E.A.T. round with the armour itself.

Figure 1:
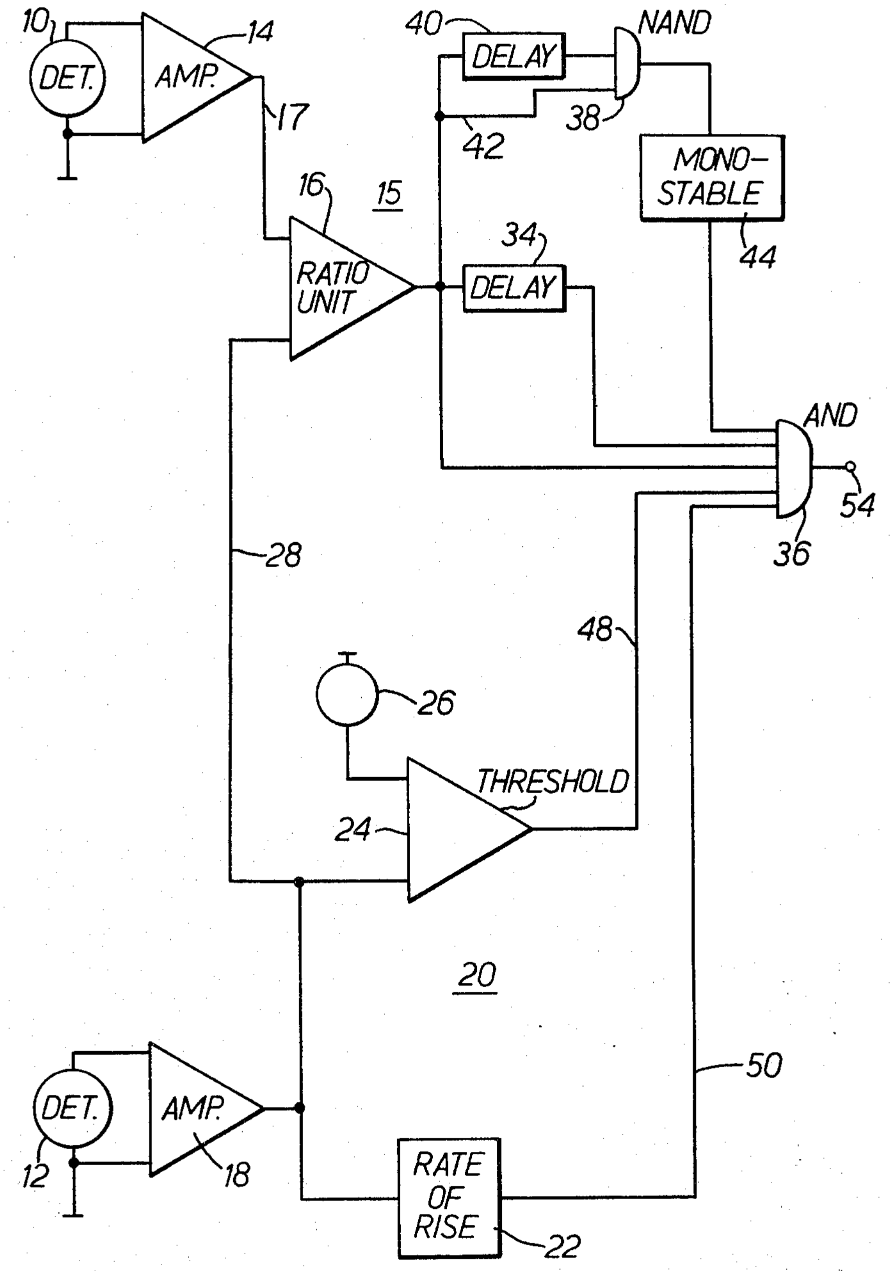
FIG. 1 is a block circuit diagram of one of the systems.

As shown in FIG. 1, one form of the system comprises two radiation detectors 10 and 12 each of which produces an electrical output in response to radiation received. Detector 10 is made to be sensitive to radiation in a narrow wavelength band at approximately 4.4 microns. The detector 12 is arranged to be sensitive to radiation in a broad wavelength band, again centred at 4.4 microns. For example, the detectors may each be a thermopile sensor arranged to receive radiation through a filter having the required wavelength transmitting band.

Detector 10 is connected to feed its electrical output to an amplifier 14 in a channel 15 and thence to one input of a ratio unit 16 by means of a line 17.

Detector 12 feeds its output through an amplifier 18 into a second channel 20. In the second channel 20, the output of amplifier 18 is fed to a rate of rise detector 22. The rate of rise detector 122 produces a "1" output when its input indicates that the intensity of the radiation sensed by detector 12 is rising at at least a predetermined rate; otherwise, it produces a "0" output.

The output of amplifier 18 is also fed to one input of a threshold comparator 24 whose other input receives a reference signal from a reference source 26 representing a predetermined level of radiation intensity. If the intensity of the radiation sensed by detector 12 exceeds this level, the comparator 24 produces a "1" output; otherwise, it produces a "0" output.

In addition, the output of amplifier 18 is fed to the first channel 15 by means of a line 28 which connects to the second input of the ratio unit 16.

In the first channel 15, the output of the ratio unit 16 is a "1" when the signals received by the unit 16 correspond to the case when the ratio of the intensity of the radiation sensed by detector 10 to the intensity of the radiation sensed by detector 12 is above a predetermined value (unity, say) and is "0" when the signals correspond to the case when the ratio is below this value. This output is fed through a delay unit 34 to one input of an AND gate 36. It is also fed to one input of a NAND gate 38 through a second delay unit 40 and fed directly to the second input of the NAND gate 38 on a line 42. The delay unit 40 may have a delay of, say, 10 milliseconds. The output of the NAND gate triggers a monostable circuit 44 whose output feeds an input of the AND gate 36. Until triggered, the circuit 44 produces a "1" output; when triggered, it produces a "0" output for its predetermined period of, in this example, 100 milliseconds.

In the second channel 20, the output of the threshold comparator 24 feeds a third input of the AND gate 36 on a line 48 while the fourth or last input of the AND gate 36 is fed from the output of the rate of rise unit 22 on a line 50.

The operation of the system will now be described in the three situations (referred to as Case I, Case II and Case III) explained in detail below.

Figure 2A:
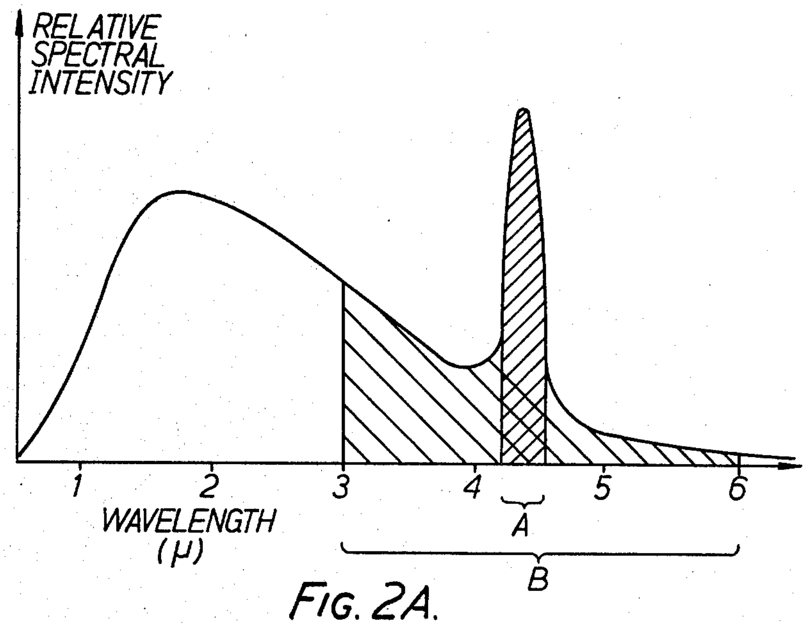
FIG. 2A is a graph of relative spectral intensity against wavelength for a fire source to be detected by the systems.
Figure 2B:
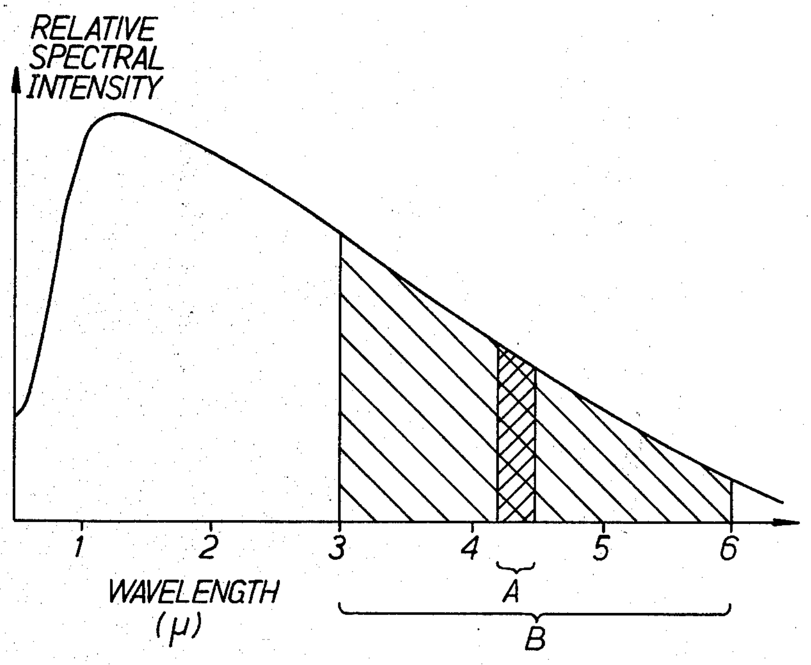
FIG. 2B is a similar graph but for a source of fire and explosion which is not to be detected by the systems.

FIG. 2A shows the relative spectral intensity of the radiation produced by a hydrocarbon flame plotted against wavelength, and FIG. 2B shows the comparable plot for the flash emitted by an exploding H.E.A.T. round. In FIGS. 2A and 2B, the wavelength ranges to which the detectors 10 and 12 are sensitive are shown at A and B respectively.

Case I

This is the case where an H.E.A.T. round hits the fuel tank of the vehicle and causes an explosive fire. In such a case, the H.E.A.T. round explodes inside the fuel tank and the resultant explosion of the H.E.A.T. round itself is "quenched" and it does not emit significant radiation. However, the burning and exploding hydrocarbon fuel causes radiation of high intensity to be emitted at 4.4 microns (corresponding to $CO_2$ emission) in the wavelength range A (FIG. 2A) as compared with the intensity of the radiation in the larger wavelength range B.

The system is arranged so that under these conditions, the ratio unit 16 (FIG. 1) receives a relatively lower input from the detector 12, on line 28, than from the detector 10 on line 17. It therefore produces a "1" output which, after a delay of 0.5 milliseconds imposed by the delay circuit 34, is passed to one input of the AND gate 36. Because the ratio unit 16 is producing a "1" output, the monostable circuit 44 is not activated and continues to feed a "1" output to its associated input of AND gate 36.

The output from the detector 12 will also be passed to the channel 20. It is assumed that the fierceness of the fire is such that the detector output rises at a greate rate than the threshold rate of the rate of rise unit 22, and therefore the latter will produce a "1" output which is fed to the AND gate 36. It is also assumed that the intensity of the radiation is such that the threshold set by the reference source 26 is exceeded, and the threshold comparator 24 will therefore also feed a "1" output to the AND gate 36.

Therefore the AND gate 36 has all its inputs energised with "1" signals and consequently it produces a "1" output at a terminal 54-which can be used to produce a fire and explosion warning signal and to initiate fire and explosion suppression.

Case II

This is the case where the H.E.A.T. round explodes in air but causes no fire. Therefore, FIGS. 2B, and not FIG. 2A, applies, and the detector 10 will sense less radiation than detector 12.

Consequently, the ratio unit 16 will be switched to produce a "0" output which will be fed to the AND gate 36 through the delay unit 34. Therefore, the AND gate 36 is disabled and cannot produce a "1" output even if detector 12 receives sufficient radiation at 4.4 microns to cause the rate of rise unit 22 and the threshold comparator 24 to produce a "1" output.

If the exploding H.E.A.T. round produces such radiation as to cause the ratio unit 16 to maintain its "0" output for longer then the delay period (10 milliseconds) of the delay unit 40, then the latter will activate the NAND gate 38 which will trigger the monostable unit 44 to produce a "0" output which will be held for the period (100 milliseconds) of the monostable unit. Therefore, for the whole of this 100 millisecond period, the AND gate 36 is held disabled and the AND gate is thus positively prevented from initiating fire or explosion suppression even if, during this period, the energy inputs to the detectors 10 and 12 change in such a manner as to cause all the other inputs of the AND gate to be switched to "1". As the exploding H.E.A.T. round fragments cool, the relative intensities of radiation emitted in the wavelength ranges A and B i of the respective detectors will change and could produce inputs to the ratio unit 16 such as to cause it to produce a "1" output, but false fire suppression, which might otherwise occur, is prevented during this 100 millisecond period by the output of the monostable circuit 44. The latter also prevents fire suppression being initiated by the ratio unit 16 producing a "1" output in response to momentary "blinding" of the detector 10 by the fragments.

Case III

This is the case where the H.E.A.T. round explodes in conditions in which its radiation is partialy "quenched", for example by the products of a hydrocarbon fire caused by the round itself.

In this case, the exploding H.E.A.T. round would emit radiation having the characteristics shown in FIG. 2B, and consequently the ratio unit 16 would be switched to produce a "0" output which would disable the AND gate 36 through the delay unit 34 in the manner explained. Fire supression would therefore be initially prevented. However, in this case the partial quenching of the exploding H.E.A.T. round would cause its radiation to fall away rapidly-before the end of the delay period (10 milliseconds) of the delay unit 40. Therefore, if a hydrocarbon fire started subsequently, the AND gate 36 would receive all "1" inputs and would initiate fire suppression.

It will be noted that channel 15, the channel which inhibits the production of the fire or explosion indicating output at terminal 54 when the radiation detected is produced by an exploding H.E.A.T. round, operates by measuring the ratio of the detector outputs and is therefore independent of the actual level of intensity of either detector output (provided that the detector 12 output exceeds the threshold of comparator 30). The system thus contrasts with systems in which inhibiting action occurs when the intensity of radiation received by a detector exceeds a relatively high threshold and is thus assumed to originate from an exploding H.E.A.T. round.

The system is also advantageous in that the ratio unit 16, which controls inhibition of fire suppression, is, as explained, responsive to the ratio of intensities at narrow and broad bands based on 4.4 microns and the variation between the value of this ratio for an H.E-.A.T. round and the value for a hydrocarbon fire can be significantly higher than, for example, systems where the ratio is taken between intensities in narrow wavelength bands both much closer to the infra-red.

The variation between the value of the ratio for an H.E.A.T. round and the value for a hydrocabon fire can be increased further, by making the detector 12 insensitive to radiation in a narrow band corresponding to that to which the detector 10 is sensitive. This can be done, for example, by placing a narrow band absorption filter (e.g. $CO_2$) in front of the detector 12. The effect of this illustrated in FIGS. 5A and 5B. By comparing these Figures with FIGS. 2A and 2B, it will be seen that the broad band B of FIGS. 2A and 2B is replaced by two relatively broad bands B1 and B2, these broad bands being separated by the relatively narrow band A. The operation is otherwise as already described.

Figure 3:
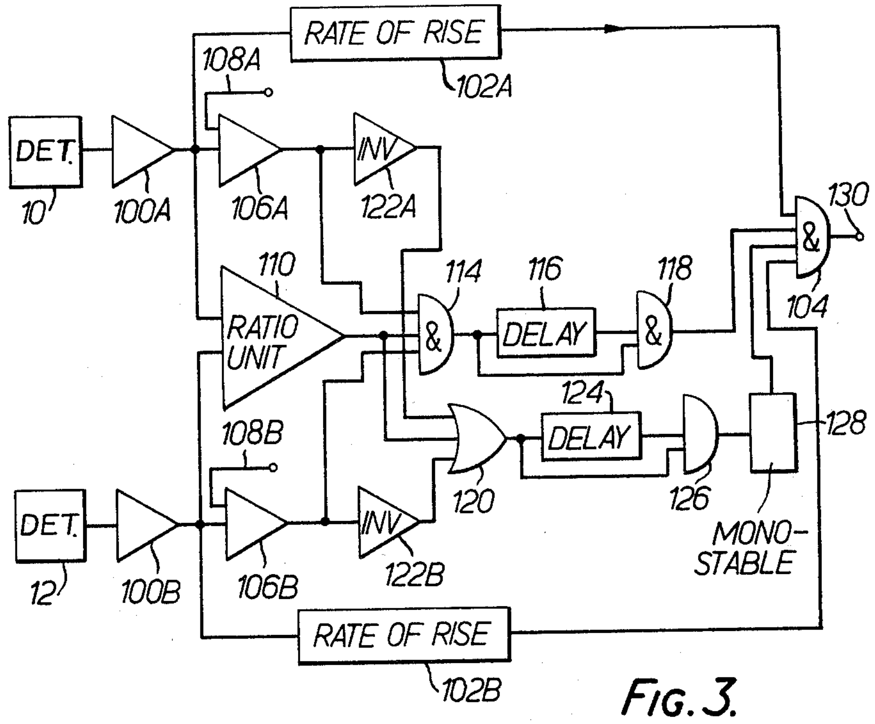
FIG. 3 is a block diagram of another of the systems.

FIG. 3 shows an alternative form of circuit arrangement.

In FIG. 3, detectors 10 and 12 may be of the same form as described above with reference to FIG. 1, with detector 10 being made sensitive to radiation in a narrow wavelength band centred at 4.4 microns and detector 12 sensitive to radiation in a broad wavelength band also centred at 4.4 microns.

The output from detector 10 is fed through an amplifier 100A to a rate of rise unit 102A which produces a "1" output to an AND gate 104 when the output from detector 10 is rising at at least a predetermined rate. The output of amplifier 100A is also fed to a threshold unit 106A which compares it with a reference signal on a line 108A and produces a "1" output when the input to the unit 106A is such as to indicate that the intensity of the radiation sensed by detector 10 has at least a predetermined, relatively low, value which is set by the reference.

Finally, the output of amplifier 100A is fed to one input of a ratio unit 110.

Detector 12 feeds corresponding components which are identified by reference numerals with the suffix "B" instead of the suffix "A".

The ratio unit 110 produces a "1" output when the ratio of the intensity of the radiation sensed by detector 10 to the intensity of the radiation sensed by detector 12 is above a predetermined value (unity, say), and produces a "0" output when the ratio is below this value. The output is fed to one input of an AND gate 114 and thence to a delay unit 116 having a delay of, say, 0.5 milliseconds. The delay unit 116 feeds one input of an AND gate 118 whose other input is directly connected to the output of the AND gate 114. AND gate 118 feeds the second input of AND gate 104.

The output of the ratio unit 110 is also fed to a NAND gate 120. The other inputs of this NAND gate are fed with the output of inverters 122A and 122B which are energised by the outputs of amplifiers 106A and 106B respectively. The output of the NAND gates 120 feeds a delay circuit 124, having a delay of 10 milliseconds. This delay unit feeds one input of an AND gate 126 whose other input is fed directly with the output of the NAND gate 120. The output of AND gate 126 triggers a monostable 128 whose output feeds the fourth input of the AND gate 104. When triggered, the monostable changes its output from "1" to "0"0 for a period of 100 milliseconds.

The operation of the arrangement of FIG. 3 will now be described with particular reference to Case I, Case II and Case III (as defined above).

Case I

In this case, the H.E.A.T. round explodes inside the fuel tank of the vehicle and the explosion of the round itself is quenched and does not emit significant radiation. However, the burning fuel produces a significant amount of radiation at 4.4 microns.

Therefore, the waveform of FIG. 2A applies and the ratio unit 110 produces a "1" output. Assuming that, at the same time, the levels of radiation produced by the detectors 10 and 12 are above the predetermined (relatively low) thresholds of the threshold units 106A and 106B, AND gate 114 passes a "1" output to the delay unit 116 and the AND gate 118. After the delay of 0.5 milliseconds (to ensure that the signals are not being produced by a transient phenomenon), the AND gate 104 receives the "1" output.

Because the ratio unit 110 is producing a "1" output, AND gate 120 will not be enabled and the monostable 128 will therefore remain in its stable state, thus maintaining its "1" output to AND gate 104.

Assuming that the rate of rise of the intensity of the radiation sensed by the detectors is above the predetermined levels set in the rate of rise units 102A and 102B, AND gate 104 will also receive "1" inputs from them.

Therefore, the AND gate 104 has all its input energized with "1" signals and consequently it produces a "1" output at terminal 130-which can be used to produce a fire and explosion warning signal and to initiate fire and explosion suppression.

Case II

In this case, FIG. 2B, and not FIG. 2A, applies, and the detector 10 will receive a relatively lower amount of radiation than detector 12.

Consequently, the ratio unit 110 produces a "0" output which is fed to AND gate 104 through AND gate 114 after the delay imposed by delay unit 116. Therefore AND gate 104 is disabled and cannot produce a "1" output and fire and explosion suppression is prevented.

If the exploding H.E.A.T. round produces such radiation that the ratio unit 110 maintains its "0" output for longer than the 10 millisecond period of delay unit 124, monostable unit 128 is triggered and produces a "0" output which it holds for its period of 100 milliseconds. As for the circuit of FIG. 1, therefore, fire and explosion suppression is prevented during this 100 millisecond period (and for the same purposes as explained above), but can take place at the end of this period.

Case III

This is the case where the H.E.A.T. round explodes in conditions in which its radiation is only partially quenched. Initially, radiation is produced having the characteristic shown in FIG. 2B, and the ratio unit 110 produces a "0" output which disables the AND gate 104 through the delay unit 116 in the manner explained, and fire suppression is initially prevented. However, provided the radiation from the exploding H.E.A.T. round falls away rapidly, before the 10 millisecond delay period of delay unit 120, subsequent starting of a hydrocarbon fire (if the intensity level and rate of rise thresholds are met) cause AND gate 104 to receive "1" inputs and thus to initiate fire and explosion suppression.

Figure 4:
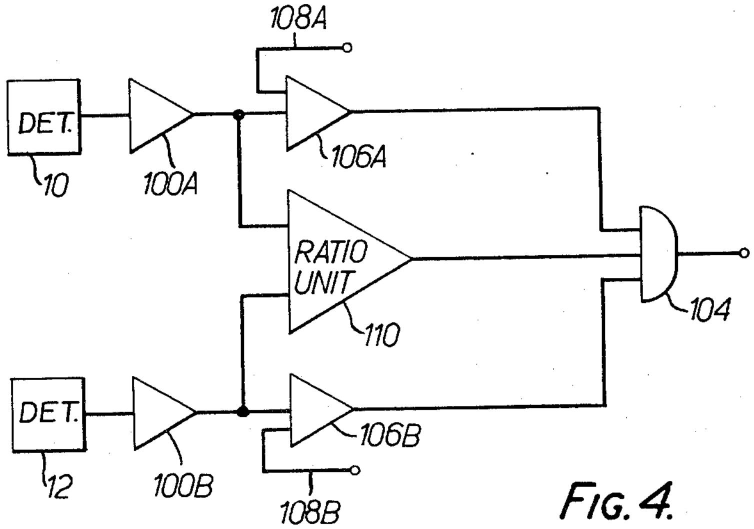
FIG. 4 is a block diagram of a further one of the systems.

FIG. 4 shows a simplified form of circuit which may be used instead of the circuit of FIG. 3 and in which items corresponding to items in FIG. 3 are similarly referenced. The basic difference between the circuits of FIGS. 3 and 4 is that the circuit of FIG. 4 omits the delay units 116 and 124 and the monostable unit 128. The operation is otherwise as described with reference to FIG. 3 with the ratio unit 110 producing a "1" output when the relative intensities of the radiation sensed by the detectors 10 and 12 are such as to indicate the presence of a hydrocarbon fire, and producing a "0" output when these relative intensities indicate an exploding H.E.A.T. round but no hydrocarbon fire.

What is claimed is:

1. A fire and explosion detection system for discriminating between radiation produced by a source of fire or explosion to be detected and radiation produced by a source of fire or explosion not to be detected, comprising first and second radiation detecting means respectively responsive to the intensity of radiation in different wavelength bands to produce respective electrical outputs, one said band being relatively broad and the other being relatively narrow and the said broad band including the said narrow band, means responsive to at least one of the detecting means for producing a first signal when at least one of the parameters comprising the intensity of the radiation received by one of the detecting means and the rate of rise of the intensity of the radiation received by one of the detecting means exceeds a predetermined value, means responsive to the two detecting means to measure the ratio of the intensities of the radiation respectively received by them and to produce a second signal when the ratio indicates that the source of the radiation is a fire or explosion source to which the system is not to respond, and output means connected to receive the first and second signals and operative to produce a fire or explosion indicating output only when the first signal exists in the absence of the second signal.

2. A system according to claim 1, in which the broad wavelength band is a band including 4.4 microns.

3. A system according to claim 1, including means responsive to the second signal and operative to produce a third signal having a first predetermined duration when the second signal has existed for at least a second predetermined duration, and in which the output means comprises means operative in response to the third signal to prevent the production of the fire and explosion indicating output in response to the first signal whether or not the second signal exists at that time.

4. A fire and explosion detection system for discriminating between radiation produced by a source of fire or explosion to be detected and radiation produced by a source of fire or explosion not to be detected, comprising first radiation detecting means responsive to the intensity of radiation in two relatively broad bands which are separated by a narrow band at which that detecting means is not responsive, second radiation detecting means responsive to the intensity of radiation in the said narrow band, means responsive to at least one of the detecting means for producing a first signal when at least one of the parameters comprising the intensity of the radiation received by one of the detecting means and the rate of rise of the radiation received by one of the detecting means exceeds a predetermined value, means responsive to the two detecting means to measure the ratio of the intensities of the radiation respectively received by them and to produce a second signal when the ratio indicates that the source of the radiation is a fire or explosion source to which the system is not to respond, and output means connected to receive the first and second signals and operative to produce a fire or explosion indicating output only when the first signal exists in the absence of the second signal.

5. A system according to claim 4, in which the center of the narrow band is substantially 4.4 microns.

6. A fire and explosion detection system for discriminating between radiation produced by a source of fire or explosion to be detected and radiation produced by a source of fire or explosion not to be detected, comprising a first radiation detector responsive to the intensity of radiation in a narrow wavelength band centered substantially at 4.4 microns, a second radiation detector responsive to the intensity of radiation in a broad wavelength band centered substantially at 4.4 microns, a threshold unit connected to receive the output of one of the detectors and operative to produce a threshold signal in response to the intensity of radiation received by that detector exceeding a predetermined threshold, a rate of rise unit connected to receive the output of one of the detectors and operative to produce a rate of rise signal in response to the rate of rise of the intensity of radiation received by that detector exceeding a predetermined value, a ratio unit connected to receive the output of both detectors and operative to produce an inhibit signal in response to the intensity of radiation received by the first radiation detector being less than that received by the second radiation detector, and a coincidence gate connected to receive the threshold signal and the rate of rise signal and responsive to the inhibit signal to produce a fire or explosion indicating output only when the threshold signal and the rate of rise signal exist together in the absence of the inhibit signal.

7. A system according to claim 6, including a second threshold unit connected to receive the output of the other of the detectors and operative to produce a second threshold signal in response to the intensity of radiation received by that detector exceeding a predetermined threshold, and in which the coincidence gate is also connected to receive the second threshold signal and is responsive to the inhibit signal to produce a fire or explosion indicating output only when both threshold signals and the rate of rise signal exist together in the absence of the inhibit signal.

8. A system according to claim 7, including a second rate of rise unit connected to receive the output of the other of the detectors and operative to produce a second rate of rise signal in response to the rate of rise of the intensity of radiation received by that detector exceeding a predetermined value, and in which the coincidence gate is also connected to receive the second rate of rise signal and is responsive to the inhibit signal to produce a fire or explosion indicating output only when both threshold signals and both rate of rise signals exist together in the absence of the inhibit signal.

9. A method of discriminating between radiation produced by a source of fire or explosion to be detected and radiation produced by a source of fire or explosion not to be detected, comprising the steps of detecting the intensity of radiation in two different wavelength bands to produce respective electrical outputs, one said band being relatively broad and the other being relatively narrow and the said broad band including the said narrow band, producing a first signal when at least one of the two parameters comprising the intensity of the radiation received in at least one of the wavelength bands and the rate of rise of the intensity of the radiation received in at least one of the wavelength bands exceeds a predetermined value, measuring the ratio of the intensities of the radiation respectively received in the two wavelength bands to produce a second signal when the ratio indicates that the source of the radiation is a fire or explosion source to which the system is not to respond, and receiving the first and second signals and enabling the production of a fire or explosion indicating output only when the first signal exists in the absence of the second signal.

* * * * *

UNITED STATES PATENT AND TRADEMARK OFFICE

CERTIFICATE OF CORRECTION

PATENT NO. : 4,357,534

DATED : November 2, 1982

INVENTOR(S) : David N. Ball

It is certified that error appears in the above—identified patent and that said Letters Patent is hereby corrected as shown below:

Column 3, line 13, delete "122" and insert -- 22 --.

Signed and Sealed this

*Twenty-second* Day of *March 1983*

[SEAL]

*Attest:*

GERALD J. MOSSINGHOFF

*Attesting Officer* *Commissioner of Patents and Trademarks*